United States Patent
Palagi et al.

(10) Patent No.: US 12,199,351 B1
(45) Date of Patent: Jan. 14, 2025

(54) PHASE CENTER STEERING FOR GRATING LOBE SUPPRESSION

(71) Applicant: Lockheed Martin Corporation, Bethesda, MD (US)

(72) Inventors: Timothy Edward Palagi, Littleton, CO (US); William Henry Conrey, Castle Rock, CO (US); Carlos James Romero, Castle Rock, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 317 days.

(21) Appl. No.: 17/570,321

(22) Filed: Jan. 6, 2022

Related U.S. Application Data

(60) Provisional application No. 63/134,494, filed on Jan. 6, 2021.

(51) Int. Cl.
*H01Q 3/38* (2006.01)
*H04B 7/06* (2006.01)

(52) U.S. Cl.
CPC ............ *H01Q 3/38* (2013.01); *H04B 7/0617* (2013.01)

(58) Field of Classification Search
None
See application file for complete search history.

(56) References Cited

U.S. PATENT DOCUMENTS

| | | |
|---|---|---|
| 6,496,158 B1 | 12/2002 | Ksienski et al. |
| 8,531,563 B2 | 9/2013 | Tanaka |

OTHER PUBLICATIONS

JP2014239370 translation (Year: 2014).*
JP2014239370A machine translation (Year: 2014).*
Thompson, Moran and Swenson, "Ch 5: Antennas and Arrays," in Interferometery and Synthesis in Radio Astronomy, 3rd Edition, p. 174.
"VLA Configurations," Web page https://public.nrao.edu/via-configurations/, 2 pages, retrieved on Apr. 5, 2022.
M. C. Vigano, G. Toso, G. Caille, C. Mangenot and I. E. Lager, "Spatial Density Tapered Sunflower Antenna Array," 2009 3rd European Conference on Antennas and Propagation, 2009, pp. 778-782.

* cited by examiner

*Primary Examiner* — Whitney Moore
(74) *Attorney, Agent, or Firm* — BAKERHOSTETLER

(57) ABSTRACT

A phased array antenna is provided that includes a plurality of antenna elements arranged in a plurality of subarrays. A plurality of first beamformers is coupled to respective elements of the plurality of antenna elements, and a plurality of second beamformers is coupled to respective subarrays of the plurality of subarrays. A controller is configured to steer a phase center for each of the plurality of subarrays using the plurality of first beamformers so that the phase centers for the plurality of subarrays are irregularly spaced.

11 Claims, 10 Drawing Sheets

PHASE CENTER STEERING FOR GRATING LOBE SUPPRESSION

This application claims the benefit of U.S. Provisional Application No. 63/134,494 filed on Jan. 6, 2021, which is hereby incorporated by reference for all purposes.

STATEMENT REGARDING FEDERALLY SPONSORED RESEARCH OR DEVELOPMENT

Not applicable.

TECHNICAL FIELD

The present description relates generally to antennas including, for example, phased array antennas.

BACKGROUND

Electronically steerable array antennas may steer beams of an antenna pattern using either analog signal processing or digital signal processing. Digital electronically steerable arrays offer the most beam agility, number of simultaneous beams, and enable statistical array signal processing based on spatial correlation. However, the analog to digital converters and the digital to analog converters required for the digital signal processing require significant power and may be untenable in power-constrained applications such as spacecraft. Analog electronically steerable arrays provide a lower power solution but lack the capabilities of the digital signal processing and therefore may not be suitable for certain applications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present disclosure is directed, in part, to a hybrid electronically steerable array antenna that takes advantage of the lower power requirements of analog signal processing and the capabilities of digital signal processing. For example, analog beamformers may be coupled to the individual antenna elements of a phased array antenna and provide steering with control less than the $\lambda/2$ level. Digital beamformers may be coupled to subarrays of the antenna elements and provide steering with control greater than the $\lambda/2$ level, where $\lambda$ is the wavelength. This hybrid solution reduces the power requirements by reducing the number of digital beamformers used but the spatially coarser digital sampling at the subarray level may result in the formation of grating lobes in the antenna pattern. According to aspects of the subject technology, the phase centers of the subarrays are electronically steered using the analog beamformers to emulate moving the antenna subarrays into an irregular pattern like a minimally redundant array. Steering the phase centers of the antenna subarrays into an irregular pattern suppresses aliasing and improves aperture efficiency.

Figure 1:
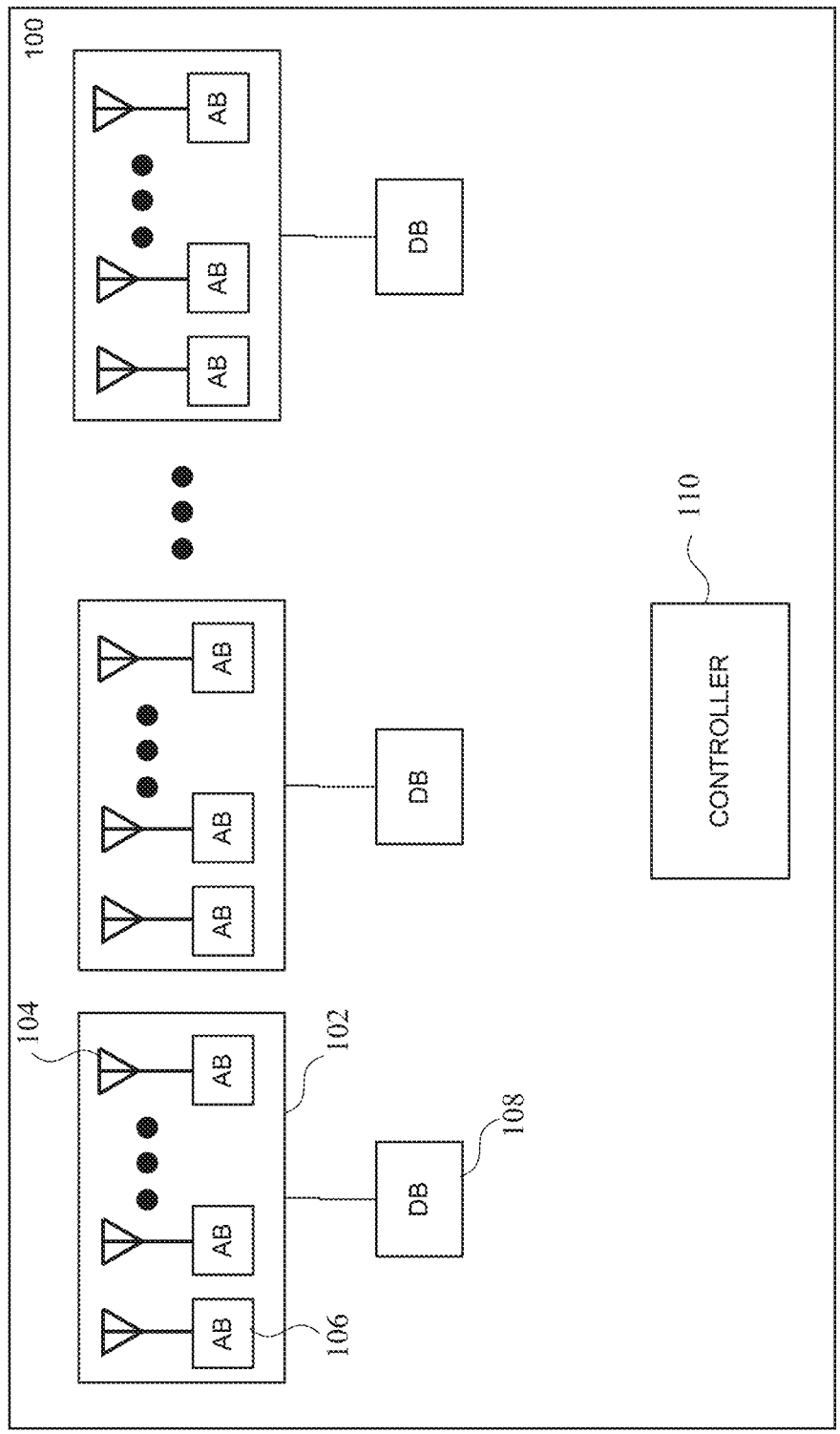
FIG. 1 is a block diagram illustrating components of a phased array antenna according to aspects of the subject technology.

FIG. 1 is a block diagram illustrating components of a phased array antenna according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 1, phased antenna array 100 includes multiple subarrays 102. Each subarray 102 includes multiple antenna elements 104 with an analog beamformer 106 coupled to each antenna element 104. As further depicted in FIG. 1, digital beamformers 108 are coupled to each subarray 102 of the phased array antenna. Controller 110 is configured to control the analog beamformers 106 to provide steering at the antenna element level and the digital beamformers 108 to provide steering at the subarray level.

Figure 2:
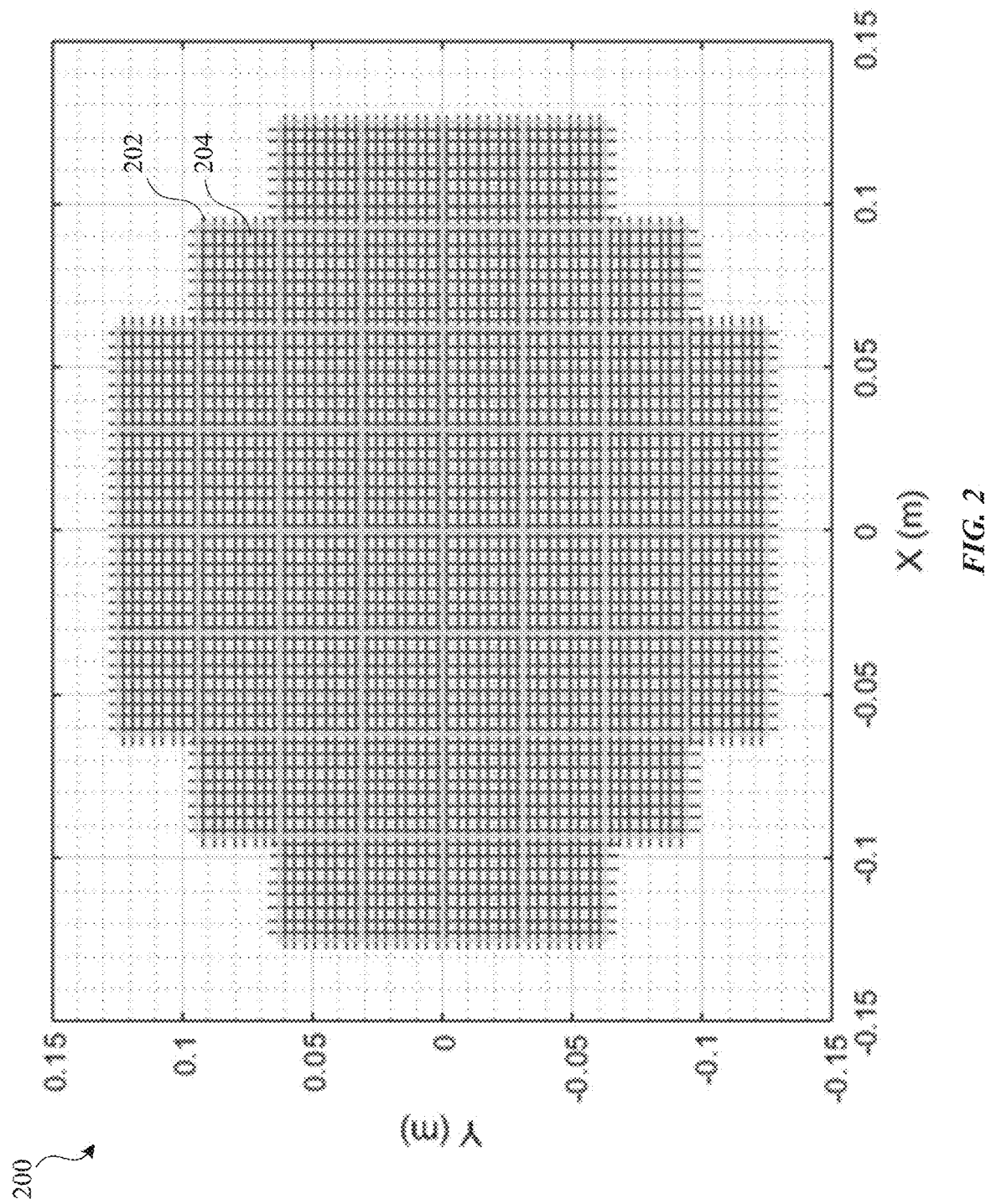
FIG. 2 depicts an example arrangement of antenna elements in a phased array antenna according to aspects of the subject technology.

The subject technology is not limited to any particular number of antenna elements, number of subarrays, or arrangement of antenna elements. For example, FIG. 2 depicts an example arrangement of antenna elements in a dtow-dimensional phased array antenna according to aspects of the subject technology. As depicted in FIG. 2, phased array antenna 200 includes 52 subarrays 202 where each subarray includes 64 antenna elements 204 arranged in an 8×8 pattern. The antenna elements 204 are arranged across the phased array antenna with regular spacing between antenna elements. The regular spacing makes manufacturing the phased antenna array easier. With this arrangement, analog beamforming may be provided at the λ/2 level and digital beamforming provided at the 4λ level.

Figure 3A:
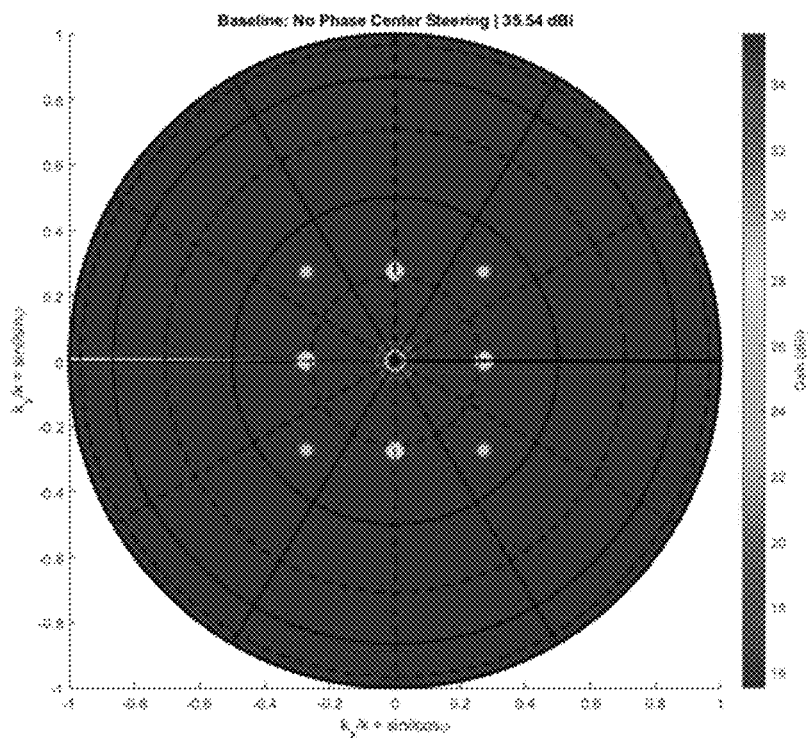
FIG. 3A illustrates a far-field antenna pattern showing the grating lobes formed with this arrangement.
Figure 3B:
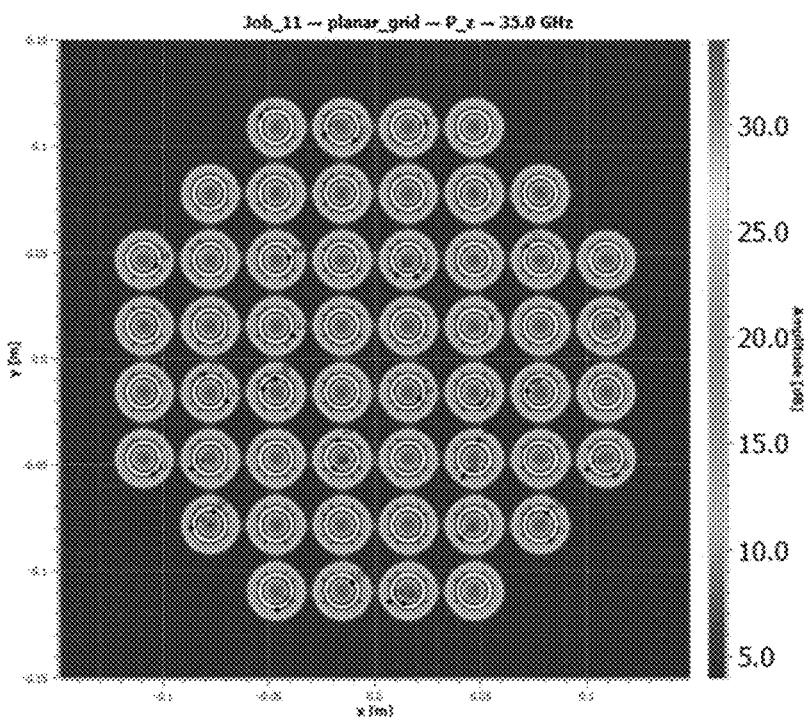
FIG. 3B illustrates a near-field antenna pattern showing a Gaussian taper being applied across each subarray.

For maximum sensitivity for phased array antenna 200, the Rayleigh beam may be employed using an amplitude of all ones across the antenna elements of phased array antenna 200. For low sidelobes, an amplitude taper may be applied across phased array antenna 200. According to aspects of the subject technology, phased array antenna 200 may be operated in an interferometer mode where instead of applying one taper across the entire aperture, individual tapers are applied across each subarray. The repeated taper combined with the redundant spacing of the antenna elements produces grating lobes. FIG. 3A illustrates a far-field antenna pattern showing the grating lobes formed with this arrangement. FIG. 3B illustrates a near-field antenna pattern showing a Gaussian taper being applied across each of the 52 subarrays.

Figure 4:
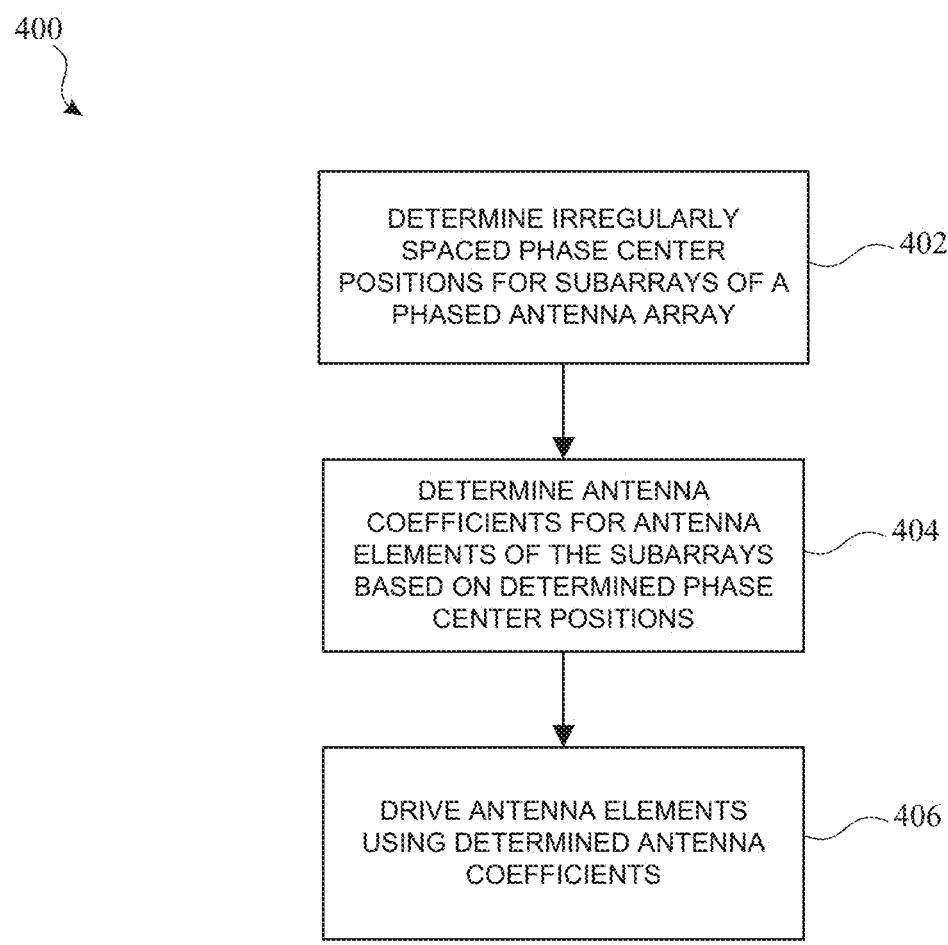
FIG. 4 is a flowchart illustrating a process for synthesizing a minimum redundancy array according to aspects of the subject technology.

According to aspects of the subject technology, grating lobes may be broken up and decohered by electronically steering the phase center in each subarray to synthesize a minimum redundancy array while maintaining the main beam direction. FIG. 4 is a flowchart illustrating a process for synthesizing a minimum redundancy array according to aspects of the subject technology.

Figure 5:
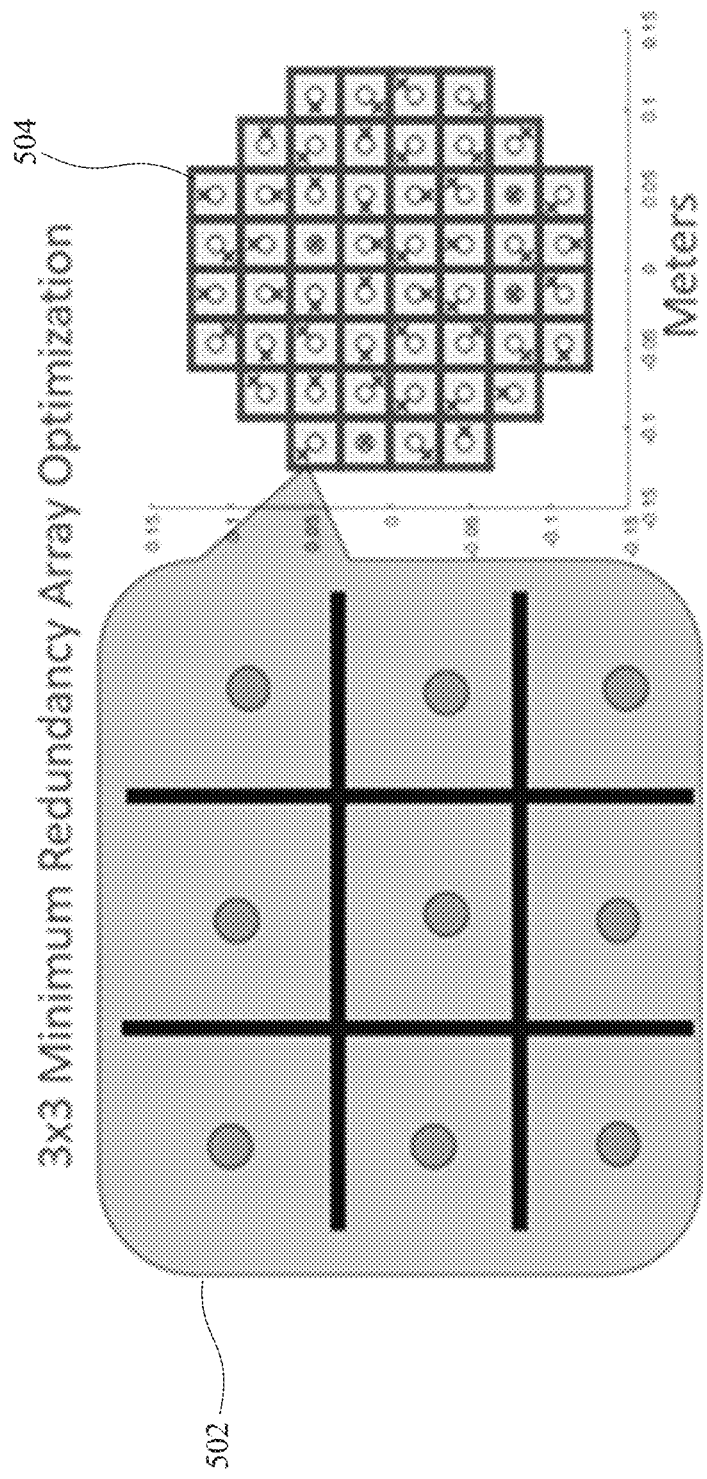
FIG. 5 illustrates a search grid used in a minimum redundancy array optimization process according to aspects of the subject technology.

As depicted in FIG. 4, process 400 begins with determining irregularly spaced phase center positions for each subarray of the phased antenna array (block 402). According to aspects of the subject technology, each subarray may be divided into a search grid. For example, FIG. 5 illustrates a 3×3 search grid 502 for each subarray. The 3×3 search grid represents just one example of a search grid. The subject technology may be implemented using other dimensioned search grids. A minimum redundancy array is synthesized by optimizing phase centers selected from the nine possible locations in the 3×3 search grid for each subarray. During the optimization, the resulting array factor may be queried for its maximum grating lobe to evaluate the current combination of phase center positions. Other optimization algorithms may be used to determine the optimal phase center locations. The subarray grid 504 depicted in FIG. 5 illustrates the irregularly spaced optimized phase center locations in each subarray with an X.

Figure 6A:
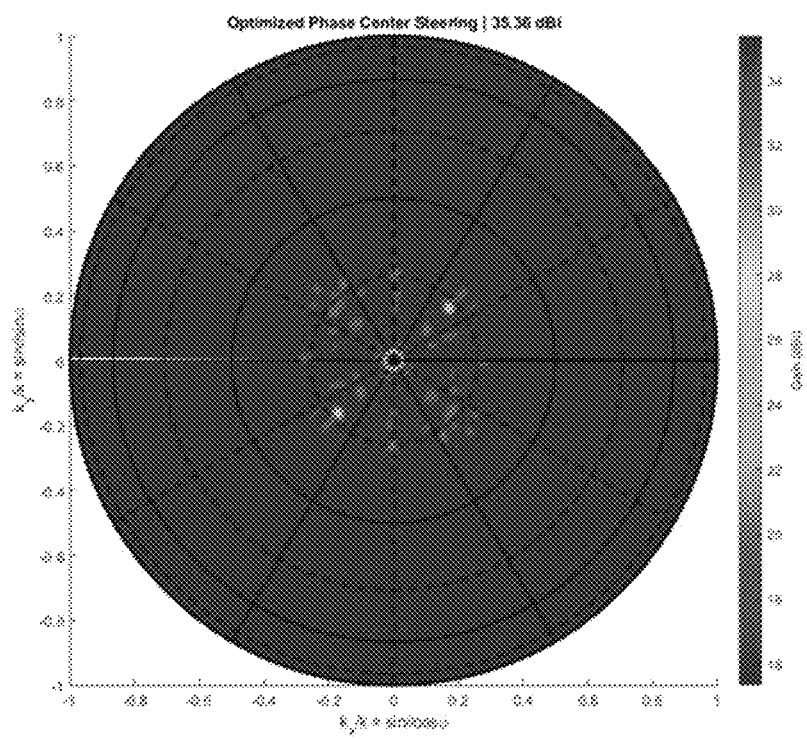
FIG. 6A illustrates a far-field antenna pattern for the phased array antenna with optimized phase center locations.
Figure 6B:
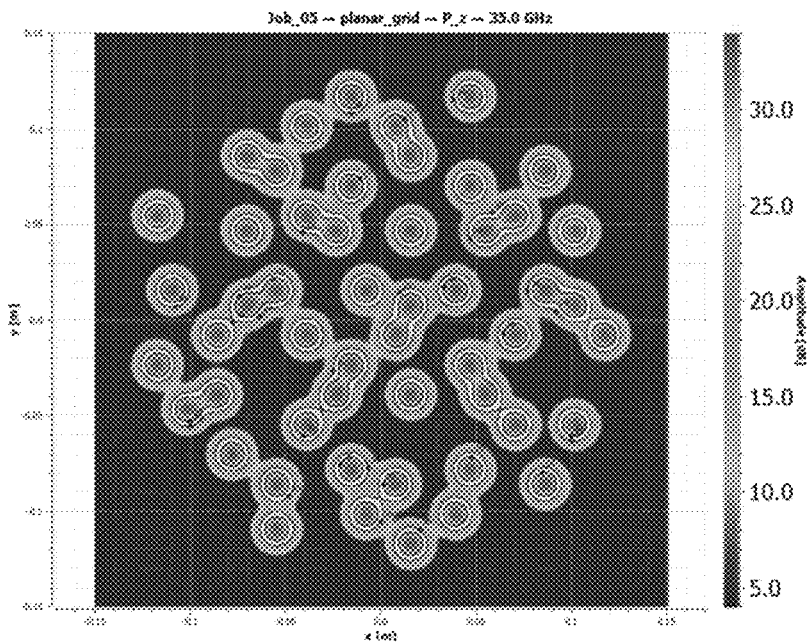
FIG. 6B illustrates a near-field antenna pattern showing the irregular spacing of the phase centers according to aspects of the subject technology.

FIG. 6A illustrates a far-field antenna pattern for the phased array antenna with the optimized phase center locations. FIG. 6B illustrates a near-field antenna pattern showing the irregular spacing of the phase centers. Comparing FIG. 6A with FIG. 3A, the far-field antenna patterns illustrate a suppression of the worst-case grating lobe from 5.7 dBc to 12.4 dBc.

Returning to FIG. 4, after the irregularly spaced phase center positions have been determined, antenna coefficients for the antenna elements of the subarrays are determined based on the determined phase center positions (block 404). For example, the determined phase center positions may be used as an optimization goal for a minmax optimization algorithm to get the actual phase centers as close as possible to the determined phase centers using the coefficients available in the analog beamformers coupled to the antenna elements in the subarrays. Other optimization algorithms may be used to determine the antenna coefficients without departing from the scope of the subject technology.

Figure 7:
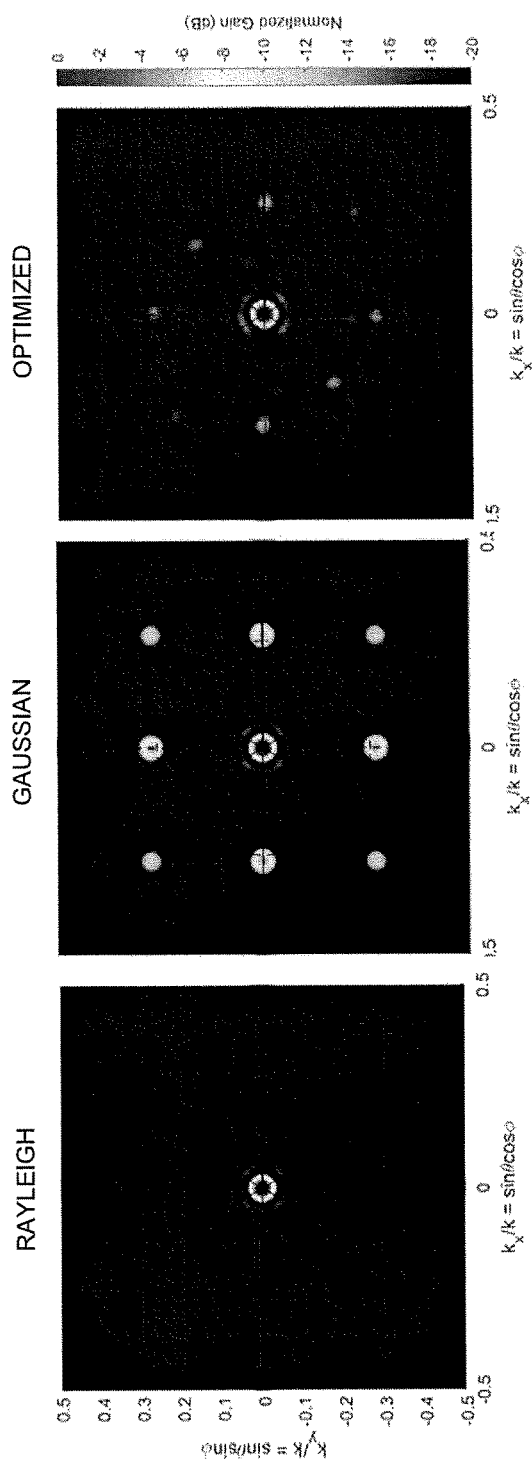
FIG. 7 depicts far-field antenna patterns for the Rayleigh beam, the uniform Gaussian taper applied across the subarrays, and the optimized version according to the subject technology.
Figure 8:
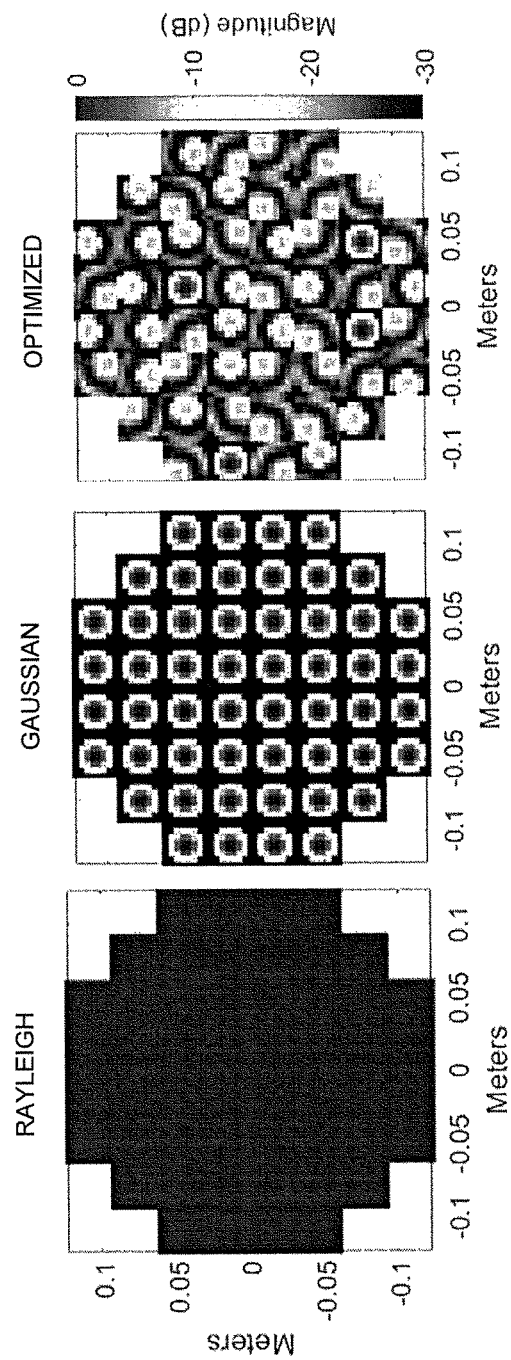
FIG. 8 depicts the antenna magnitude coefficients for the Rayleigh beam, the uniform Gaussian taper, and the optimized version according to aspects of the subject technology.
Figure 9:
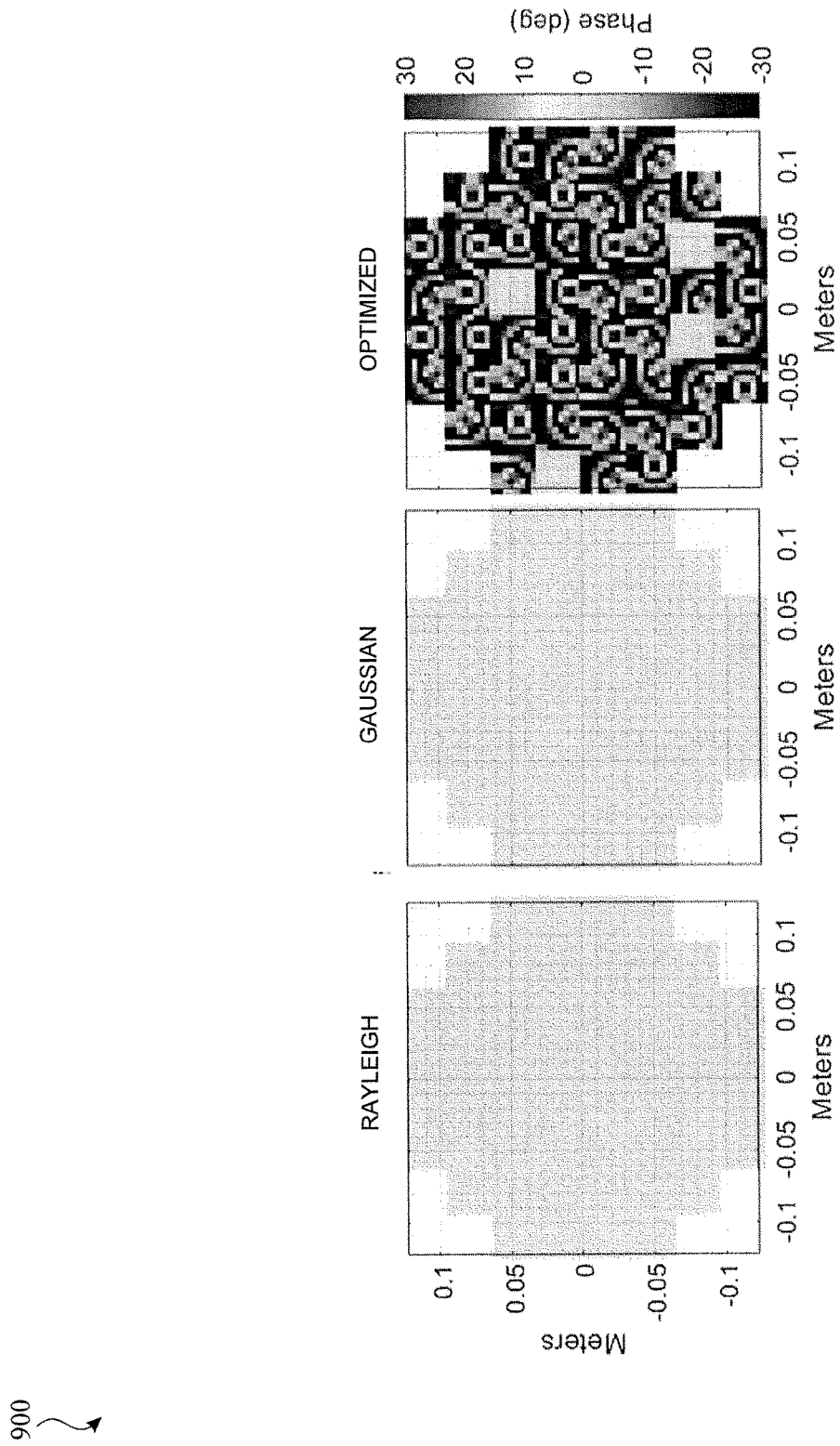
FIG. 9 depicts the antenna phase coefficients for the Rayleigh beam, the uniform Gaussian taper, and the optimized version according to aspects of the subject technology.

FIG. 7 depicts far-field antenna patterns for the Rayleigh beam, the repeated Gaussian taper applied across the subarrays, and the optimized version according to the subject technology. As illustrated in the figure, grating lobes become prominent in the Gaussian taper example and are suppressed in the optimized example. FIG. 8 depicts the antenna magnitude coefficients for the Rayleigh beam, the repeated Gaussian taper, and the optimized version. FIG. 9 depicts the antenna phase coefficients for the Rayleigh beam, the repeated Gaussian taper, and the optimized version. Returning to FIG. 4, the antenna elements are driven using the determined coefficients to reduce the grating lobes in the resulting antenna pattern (block 406).

Figure 10:
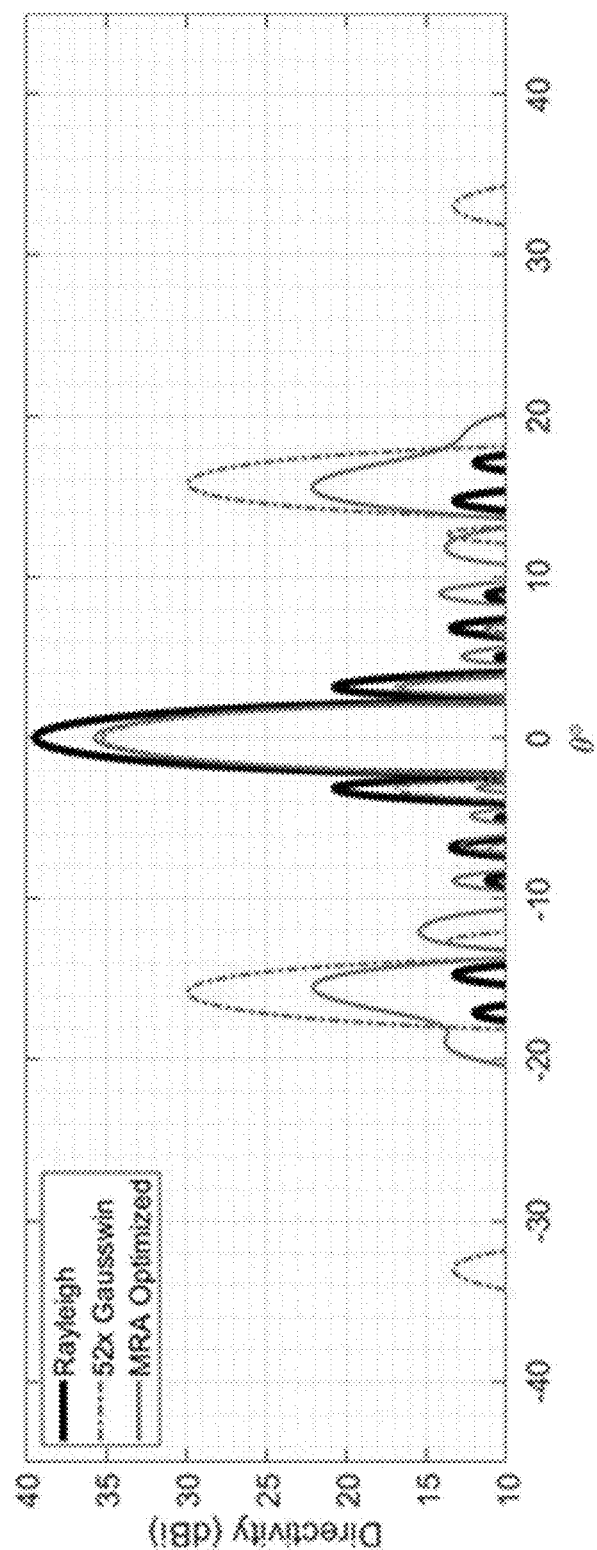
FIG. 10 is a graph illustrating the directivity along the principal plane of the antenna patterns for the Rayleigh beam, the repeated Gaussian taper, and the optimized version according to aspects of the subject technology

FIG. 10 is a graph illustrating the directivity along the principal plane of the antenna patterns depicted in FIG. 7 for the Rayleigh beam, the repeated Gaussian taper, and the optimized version according to aspects of the subject technology. The comparison of these three examples is summarized in Table 1 below.

TABLE 1

|  | Gain | Aperture Efficiency | Taper Loss | Phase Error Loss | Aliasing or Sidelobe | Aliasing Suppression |
|---|---|---|---|---|---|---|
| Area | 39.16 dB |  |  |  |  |  |
| Rayleigh | 39.40 dB | 0.00 dB | 0.00 dB | 0.00 dB | −27.30 dB |  |
| Gaussian | 35.21 dB | 4.18 dB | 4.21 dB | −0.02 dB | −5.34 dB |  |
| Optimized | 35.68 dB | 3.71 dB | 3.37 dB | 0.34 dB | −13.42 dB | −8.08 dB |

The area gain was calculated using the example of 52 subarrays of 64 elements (3,328 elements) measuring 3.8 mm². The difference between the Rayleigh gain and the area gain is due to extra area of the antenna elements around the perimeter of the array in the model used to calculate the Rayleigh gain. As depicted in FIG. 10 and represented in Table 1, the beam generated by the optimized version of the phased antenna array is 0.47 dB more efficient/sensitive than the repeated Gaussian taper example and suppresses the aliasing by 8.08 dB compared to the repeated Gaussian taper example.

According to aspects of the subject technology, a phased array antenna is provided that includes a plurality of antenna elements arranged in a plurality of subarrays. A plurality of first beamformers is coupled to respective elements of the plurality of antenna elements, and a plurality of second beamformers is coupled to respective subarrays of the plurality of subarrays. A controller is configured to steer a phase center for each of the plurality of subarrays using the plurality of first beamformers so that the phase centers for the plurality of subarrays are irregularly spaced.

The plurality of first beamformers may be analog beamformers. The plurality of second beamformers may be digital beamformers. The antenna elements of the plurality of antenna elements may be regularly spaced in the plurality of subarrays. The controller may be further configured to operate the phased array antenna in an interferometer mode. The positions of the phase centers for the plurality of subarrays may be steered to suppress grating lobes in an antenna pattern of the phased array antenna.

According to aspects of the subject technology, a method is provided that includes determining an irregularly spaced phase center position for each of a plurality of subarrays of a phased array antenna, determining antenna coefficients for each of a plurality of antenna elements from each of the plurality of subarrays based on the determined phase center positions, and driving the plurality of antenna elements using the determined antenna coefficients to steer the phase center positions of the plurality of subarrays to be irregularly spaced.

Determining an irregularly spaced phase center position may include selecting a phase center position from a plurality of possible phase center positions. The phase center position may be selected based on a maximum grating lobe value generated using the phase center position in the phased array antenna. Determining antenna coefficients for each of the plurality of antenna elements may include performing a minmax optimization of the phase center position using available coefficients for the plurality of antenna elements. The determined antenna coefficients may be for analog beamformers coupled to respective antenna elements of the plurality of antenna elements. Each subarray of the plurality of subarrays in the phased array antenna may be coupled to a digital beamformer.

According to aspects of the subject technology, a phased array antenna is provided that includes a two-dimensional array of regularly spaced antenna elements, wherein the antenna elements are further organized in a two-dimensional arrangement of subarrays. A plurality of first beamformers is coupled to respective ones of the antenna elements. A plurality of second beamformers is coupled to respective ones of the subarrays. A controller is configured to steer a phase center for each of the subarrays using the plurality of first beamformers so that the phase centers for the subarrays are irregularly spaced.

The plurality of first beamformers may be analog beamformers. The plurality of second beamformers may be digital beamformers. The controller may be further configured to operate the phased array antenna in an interferometer mode. The positions of the phase centers for the subarrays are steered to suppress grating lobes in an antenna pattern of the phased array antenna.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The invention claimed is:

1. A phased array antenna, comprising:
 a plurality of antenna elements arranged in a plurality of subarrays, wherein each subarray of the plurality of subarrays is divided into a search grid;
 a plurality of first beamformers coupled to respective antenna elements of the plurality of antenna elements;
 a plurality of second beamformers coupled to respective subarrays of the plurality of subarrays; and
 a controller configured to steer a phase center for each of the plurality of subarrays using the plurality of first beamformers so that the phase center for each of the plurality of subarrays are irregularly spaced, wherein the phase center for each of the plurality of subarrays is determined based on the search grid of the subarray.

2. The phased array antenna of claim 1, wherein the plurality of first beamformers are analog beamformers.

3. The phased array antenna of claim 1, wherein the plurality of second beamformers are digital beamformers.

4. The phased array antenna of claim 1, wherein the antenna elements of the plurality of antenna elements are regularly spaced in the plurality of subarrays.

5. The phased array antenna of claim 1, wherein the controller is further configured to operate the phased array antenna in an interferometer mode.

6. The phased array antenna of claim 1, wherein respective positions of the phase center for the plurality of subarrays are steered to suppress grating lobes in an antenna pattern of the phased array antenna.

7. A phased array antenna, comprising:
a two-dimensional array of regularly spaced antenna elements, wherein the regularly spaced antenna elements are further organized in a two-dimensional arrangement of subarrays, and each subarray comprises a grid;
a plurality of first beamformers coupled to respective ones of the regularly spaced antenna elements;
a plurality of second beamformers coupled to respective ones of the subarrays; and
a controller configured to steer a phase center for each of the subarrays using the plurality of first beamformers so that the phase centers for the subarrays are irregularly spaced, wherein prior to steering the phase center for each of the subarrays, current phase centers, determined by the controller based on the grid, are queried for grating lobe to evaluate a current combination of respective positions of the phase center.

8. The phased array antenna of claim 7, wherein the plurality of first beamformers are analog beamformers.

9. The phased array antenna of claim 7, wherein the plurality of second beamformers are digital beamformers.

10. The phased array antenna of claim 7, wherein the controller is further configured to operate the phased array antenna in an interferometer mode.

11. The phased array antenna of claim 7, wherein respective positions of the phase center for the subarrays are steered to suppress grating lobes in an antenna pattern of the phased array antenna.

* * * * *